3,690,865
METHOD OF COMBATING UNWANTED
VEGETATION IN SUGAR BEET FIELDS
James L. Ahle, Shawnee Mission, Kans., assignor to Gulf Research & Development Company, Pittsburgh, Pa.
No Drawing. Filed Dec. 8, 1970, Ser. No. 96,249
Int. Cl. A01n 9/02
U.S. Cl. 71—118          2 Claims

ABSTRACT OF THE DISCLOSURE

Undesired vegetation such as crabgrass, black nightshade, lambsquarters, pigweed, barnyard grass and kochia are combated in crops including sugar beets, cotton, soybeans and peanuts by pre-emergent application of an effective amount of a composition comprising one part by weight of N-benzyl-N-isopropylpivalamide and from one-third to three parts by weight of N-benzyl-N-isopropyl-3,5-dichlorobenzamide.

DESCRIPTION OF INVENTION

A new class of compounds which have recently been found to have particularly desirable selective pre-emergent herbicidal activity may be described as having the following general structural formula,

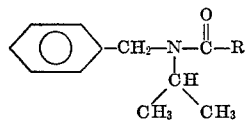

in which R is selected from tertiary butyl and the structure having the formula

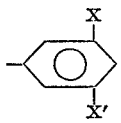

in which X and X' may be alike or unlike and are selected from the group consisting of chloro, bromo, methyl and methoxy substituents, with the additional provision that either one of X or X' may be hydrogen.

Among effective compounds of the new class are two specific compounds:

N-benzyl-N-isopropylpivalamide (B.P. 87° C./0.07 mm.), and

N-benzyl-N-isopropyl-3,5-dichlorobenzamide (M.P. 96–98° C.).

These compounds may be readily synthesized from commercially available substances by means of procedures of the type exemplified below:

Preparation of N-benzyl-N-isopropylpivalamide

A one-liter reaction flask fitted with a power stirrer, heating mantle, dropping funnel, thermometer, water-cooled condenser and drying tube was charged with 149.2 g. (1.0 mole) N-benzyl-N-isopropylamine, 350 ml. of benzene and 111.1 g. (1.1 mole) of triethylamine. The dropping funnel contained 126.6 g. (1.05 mole) of pivalyl chloride which was added dropwise to the stirred reaction mixture. After the addition was completed, the reaction mixture was stirred and heated at 75–80° for 18 hours. The mixture was cooled and the amine-salt was collected on a vacuum filter. The filtrate was transferred to a separatory funnel and extracted with water which was followed by dilute aqueous hydrochloric acid. The organic phase was dried over sodium sulfate. After removing the drying agent, the solvent was evaporated. The liquid residue was transferred to a pot which was appropriately fitted for a simple vacuum distillation. The forecut material proved to be mainly trimethylacetyl chloride and trimethylacetic acid. The product fraction weighed 188.6 g., B.P. 86–87/0.07 mm., $N_D^{25}$ 1.5074.

Analysis.—Calcd. for $C_{15}H_{23}NO$ (percent): C, 77.21; H, 9.93; N, 6.00. Found (percent): C, 76.96; H, 9.89; N, 6.21.

Preparation of N-benzyl-N-isopropyl-3,5-dichlorobenzamide

A small reaction flask fitted with a magnetic stirrer, heating mantle, thermometer, water-cooled condenser and drying tube was charged with 25.0 g. (0.131 mole) of 3,5-dichlorobenzoic acid, 75 ml. of thionyl chloride and 6 drops of N,N-dimethylformamide. The reaction mixture was stirrer and refluxed for 18 hours. The excess thionyl chloride was removed by evaporation. The liquid residue was charged to a pot fitted with a short column and appropriately equipped for vacuum distillation. The 3,5-dichlorobenzoyl chloride product cut weighed 24.1 g., B.P. 63–5° C./0.3 mm.

A 500-milliliter reaction flask equipped with a magnetic stirrer, heating mantle, dropping funnel, air-cooled condenser and drying tube was charged with 7.8 g. (0.052 mole) of N-benzyl-N-isopropylamine, 400 ml. of benzene and 7.0 g. (0.07 mole) of triethylamine. The dropping funnel contained 10.5 g. (0.05 mole) of 3,5-dichlorobenzoyl chloride which was added dropwise to the stirred reaction mixture. After the addition was completed, the reaction mixture was stirred and heated at 60–65° C. for 18 hours. The mixture was cooled and the amine-salt was collected on a vacuum filter. The filtrate was transferred to a separatory funnel and extracted with water which was followed by dilute aqueous hydrochloric acid.

The organic phase was dried over sodium sulfate. After removing the drying agent, the solvent was evaporated. The solid residue was warmed with hexane, cooled and the product was collected. There was obtained 9.9 g. of white crystalline solid, M.P. 96–98° C.

Analysis.—Calcd. for $C_{17}H_{17}Cl_2NO$ (percent): C, 63.37; H, 5.32; N, 4.35. Found (percent): C, 63.13; H, 5.18; N, 3.95.

I have discovered that a combination of the two herbicides mentioned above is extraordinarily effective in controlling weeds in sugar beet fields, particularly grasses and competing species of Amaranthus (which are present in all cultivated areas) and Kochia which are particularly prevalent in areas of the Western United States. The reason for the surprisingly thorough weed control of the combination of competing weeds becomes apparent upon reduction of the rate of application to a level at which complete kills do not mask relative effectiveness. At these reduced levels it becomes obvious that the effect on Kochia in particular and probably on grasses such as barnyard grass is synergistic. The occurrence of synergism between compounds of the same class is unexpected, as this phenomenon usually indicates that the phytotoxic effects of the two compounds operate by different mechanisms. This discovery makes possible an improved method of combating undesired vegetation in sugar beet fields which comprises applying pre-emergently to the locus of seeds of the undesired vegetation an effective amount of a composition comprising one part by weight of N-benzyl-N-isopropylpivalamide and from one third to three, preferably about 1⅔, parts by weight of N-benzyl-N-isopropyl-3,5-dichlorobenzamide.

Formulation of the herbicides

The herbicides employed in the method of this invention may be conveniently formulated in organic solvents, as dry granular materials or in water-dispersible form for use in aqueous sprays. By way of illustration, N-benzyl-N-isopropylpivalamide may be formulated as about a 24 percent solution along with about 66 percent xylene or other solvent and 10 percent of a surfactant such as Agrimul A-300 or N-300, Sponto 934 or 234, Atlox 3408F or Triton X-180 or a mixture of Triton X-180 and X-190 or other dispersant or emulsifier which is recommended and approved for use with herbicides. Analyses of these surfactants are available from the agencies which approve the materials for agricultural use. In general, blends of both ionic and nonionic surfactants are desirable because they confer good water dispersibility on the formulations over a wide range of temperature, water hardness and other conditions. A blend of equal parts of Atlox 3404F and 3403F, for example, has been found to be particularly useful.

A granular formulation may be made by dissolving the herbicide in acetone and spraying the acetone solution on finely divided attapulgite while agitating as a rolling bed in a revolving drum. The resulting granules which form are then dried to remove the solvent.

Pre-emergent use of the herbicides

Disposable expanded polystyrene trays about three inches deep and about ten inches wide and one foot long were filled with greenhouse potting soil and seeded with the desired plant species. An emulsifiable concentrate formulation of each compound was prepared by using organic solvents and surfactants. The desired rates of application were obtained by measuring out specific quantities with a syringe and dispersing into 80 ml. of water. The solution was applied with a sprayer at 40 gal. per acre. After spraying, the flats were placed on a bench in the greenhouse and watered. Individual compounds and combinations were also compared with Ro-Neet (S-ethyl cyclohexylethylthiocarbamate) and Ordram (S-ethyl hexahydro-1H-axepine-1-carbothioate). Each compound and the combinations were sprayed at various rates of application, as indicated in the tabulated results.

Twenty-one days after seeding and treatment the plantings were examined and degree of herbicidal effect was rated according to the schedule below:

DEGREE

0=no effect
1=slight effect
2=moderate effect
3=severe effect
4=maximum effect (all plants died)

Results are presented in the following table.

TABLE I

Pre-emergent control of weeds with N-benzyl-N-isopropylpivalamide (Compound No. 1) and N-benzyl-N-isopropyl-3,5-dichlorobenzamide (Compound No. 2)

| Compound No. | Rate, lb./a. | Lambs-quarter | Pig-weed | Black nightshade | Kochia | Sugar beet | Barnyard grass | Wild oats | Rice |
|---|---|---|---|---|---|---|---|---|---|
| 1 | 4 | 3 | 1 | 2 | 1 | 1 | 4 | 4 | 3 |
| 2 | 4 | 4 | 4 | 4 | 4 | 2 | 4 | 4 | 1 |
| 1+2 | 2+2 | 4 | 4 | 4 | 4 | 2 | 4 | 4 | 4 |
| | 3+1 | 4 | 4 | 4 | 3 | 3 | 4 | 4 | |
| | 2½+1½ | 4 | 4 | 4 | 4 | 3 | 4 | 4 | |
| | 1½+2½ | 4 | 4 | 4 | 4 | 1 | 4 | 4 | |
| | 1+3 | 4 | 4 | 4 | 4 | 3 | 4 | 4 | |
| Ro-Neet | 4 | 4 | 4 | 4 | 0 | 0 | 4 | 4 | 4 |
| Ordram | 4 | 4 | 4 | 4 | 4 | 3 | 4 | | 4 |
| 1 | 2 | 2 | 0 | 1 | 0 | 0 | 4 | 4 | 3 |
| 2 | 2 | 4 | 4 | 3 | 4 | 0 | 4 | 3 | 0 |
| 1+2 | 1+1 | 4 | 4 | 3 | 4 | 0 | 4 | 3 | 4 |
| | 1½+½ | 4 | 4 | 4 | 2 | 1 | 4 | 4 | |
| | 1¼+¾ | 4 | 4 | 4 | 2 | 1 | 4 | 4 | |
| | ¾+1¼ | 4 | 4 | 4 | 4 | 0 | 4 | 3 | |
| | ½+1½ | 4 | 4 | 4 | 4 | 1 | 4 | 2 | |
| Ro-Neet | 2 | 3 | 4 | 4 | 0 | 0 | 4 | 4 | 4 |
| Ordram | 2 | 3 | 3 | 3 | 4 | 1 | 4 | | 3 |
| 1 | 1 | 1 | 0 | 0 | 0 | 0 | 1 | 3 | 0 |
| 2 | 1 | 4 | 2 | 3 | 2 | 0 | 1 | 1 | 0 |
| 1+2 | ½+½ | 4 | 1 | 3 | 4 | 0 | 3 | 1 | 2 |
| | ¾+¼ | 3 | 3 | 1 | 0 | 0 | 4 | 2 | |
| | ⅝+⅜ | 4 | 4 | 3 | 1 | 0 | 4 | 2 | |
| | ⅜+⅝ | 4 | 4 | 4 | 4 | 0 | 4 | 1 | |
| | ¼+¾ | 4 | 4 | 4 | 4 | 0 | 3 | 1 | |
| Ro-Neet | 1 | 2 | 4 | 3 | 0 | 0 | 4 | 3 | 4 |
| Ordram | 1 | 3 | 2 | 0 | 0 | 0 | 4 | | 0 |
| 1 | ½ | 0 | 0 | 0 | 0 | 0 | 0 | 0 | 0 |
| 2 | ½ | 3 | 1 | 1 | 0 | 0 | 0 | 0 | 0 |
| 1+2 | ¼+¼ | 2 | 0 | 1 | 1 | 0 | 0 | 0 | |
| | ⅜+⅛ | 1 | 0 | 0 | 0 | 0 | 3 | 0 | |
| | ⁵⁄₁₆+³⁄₁₆ | 1 | 1 | 0 | 0 | 0 | 2 | 0 | |
| | ³⁄₁₆+⁵⁄₁₆ | 2 | 1 | 3 | 1 | 0 | 2 | 0 | |
| | ⅛+⅜ | 4 | 1 | 4 | 1 | 0 | 1 | 0 | |
| Ro-Neet | ½ | 1 | 3 | 1 | 0 | 0 | 3 | 0 | 4 |
| Ordram | ½ | 1 | 1 | 0 | 0 | 0 | 4 | | 0 |

The data tabulated above show clearly the synergistic effect of the combination of herbicides on Kochia species. In a second group of tests a larger number of plant species was employed to give a better indication of the scope of the utility of the method. As shown in the following table, the tabulated results indicate that the method may be used to advantage in a number of crops, including sugar beets, cotton, soybeans, peanuts and even in tomatoes, a crop which is very sensitive to herbicidal injury. The rating of plant injury in the table is made according to the schedule disclosed above.

I claim:
1. The method of combating a combination of both Amaranthus and Kochia species consisting of applying pre-emergently to the locus of seeds of the undesired species an effective amount at least 1 lb. per acre of a composition consisting essentially of one part by weight of N-benzyl-N-isopropylpivalamide and from one and two-thirds to three parts by weight of N-benzyl-N-isopropyl-3,5-dichlorobenzamide.
2. The method of claim 1 in which the composition consists essentiallly of one part by weight N-benzyl-N-isopropylpivalamide and about one and two-thirds parts by weight N-benzyl-N-isopropyl-3,5-dichlorobenzamide.

TABLE II
Applicability of the method to a variety of species

| Compound No. | Rate, lb./a. | Lambs-quarter | Pig-weed | Kochia | Sugar beet | Cotton | Soybean | Peanut | Green foxtail | Crabgrass | Yellow foxtail | Barnyard grass | Cocklebur | Tomato |
|---|---|---|---|---|---|---|---|---|---|---|---|---|---|---|
| 1 | 2 | 3 | 3 | 3 | 1 | 0 | 0 | 0 | 4 | 4 | 4 | 4 | 0 | 0 |
| 2 | 2 | 4 | 4 | 3 | 0 | 0 | 1 | 0 | 4 | 4 | 4 | 3 | 0 | 3 |
| 1+2 | 1+1 | 4 | 4 | 4 | 0 | 0 | 0 | 0 | 4 | 4 | 4 | 4 | 0 | 3 |
| 1 | 1 | 2 | 2 | 0 | 0 | 0 | 0 | 0 | 3 | 4 | 3 | 2 | 0 | 0 |
| 2 | 1 | 4 | 4 | 2 | 0 | 0 | 0 | 0 | 4 | 4 | 3 | 0 | 0 | 2 |
| 1+2 | ½+½ | 4 | 4 | 4 | 0 | 0 | 0 | 0 | 3 | 4 | 3 | 2 | 0 | 1 |

References Cited

UNITED STATES PATENTS

| | | | |
|---|---|---|---|
| 3,498,781 | 3/1970 | Buntin | 71—118 |
| 2,864,679 | 12/1958 | Hamm et al. | 71—118 |
| 3,342,859 | 9/1967 | Dorfman et al. | 71—118 |
| 3,436,208 | 4/1969 | Lemin | 71—118 |

FOREIGN PATENTS

| | | | |
|---|---|---|---|
| 971,819 | 10/1964 | Great Britain | 71—118 |
| 1,131,022 | 10/1968 | Great Britain | 71—118 |

OTHER REFERENCES

Viste et al.: "Dimethylpropynylbenzamides, etc.," (1970), CA 72, No. 77803h (1970).

Carpenter et al.: "Herbicidal activity of halogenhydroxybenzonitriles" (1964), CA 63, p. 13958 (1965).

Dermer et al.: "N-benzylamides as ders. for, etc.," (1963), CA 37, pp. 3733–34 (1943).

LEWIS GOTTS, Primary Examiner

G. HOLLRAH, Assistant Examiner

U.S. Cl. X.R.

260—558 R, 562 R